United States Patent
Couperthwaite (10) Patent No.: US 12,358,430 B2
(45) Date of Patent: Jul. 15, 2025

(54) MODULAR SEMI-TRAILER SENSOR SUITE

(71) Applicant: STONERIDGE ELECTRONICS AB, Solna (SE)

(72) Inventor: John Couperthwaite, Ypsilanti, MI (US)

(73) Assignee: Stoneridge Electronics AB, Solna (SE)

( * ) Notice: Subject to any disclaimer, the term of this patent is extended or adjusted under 35 U.S.C. 154(b) by 19 days.

(21) Appl. No.: 18/338,663

(22) Filed: Jun. 21, 2023

(65) Prior Publication Data

US 2023/0415651 A1  Dec. 28, 2023

Related U.S. Application Data

(60) Provisional application No. 63/354,925, filed on Jun. 23, 2022.

(51) Int. Cl.
 *B60R 1/26* (2022.01)
 *G06T 7/70* (2017.01)

(52) U.S. Cl.
 CPC ............... *B60R 1/26* (2022.01); *G06T 7/70* (2017.01); *B60R 2300/105* (2013.01); *G06T 2207/30252* (2013.01)

(58) Field of Classification Search
 CPC ....... B60R 1/26; B60R 2300/105; B60R 1/00; G06T 7/70; G06T 2207/30252
 See application file for complete search history.

(56) References Cited

U.S. PATENT DOCUMENTS

| | | | |
|---|---|---|---|
| 6,933,837 B2 | 8/2005 | Gunderson et al. | |
| 10,259,390 B2 | 4/2019 | Zhang et al. | |
| 10,518,702 B2 | 12/2019 | Al Rasheed et al. | |
| 10,549,694 B2 | 2/2020 | Murad et al. | |
| 2013/0038731 A1* | 2/2013 | Brey | B60R 11/04 348/148 |
| 2014/0176717 A1* | 6/2014 | De Paschoal | B60R 11/04 348/148 |
| 2016/0243988 A1* | 8/2016 | Peterson | B60R 1/0617 |
| 2017/0054948 A1* | 2/2017 | Angel | G06V 20/56 |
| 2017/0124881 A1 | 5/2017 | Whitehead | |

(Continued)

FOREIGN PATENT DOCUMENTS

| CN | 112373391 A | 2/2021 |
|---|---|---|
| DE | 102010032411 A1 | 2/2012 |
| EP | 2893527 B1 | 8/2017 |

*Primary Examiner* — Farzana Hossain
(74) *Attorney, Agent, or Firm* — Carlson, Gaskey & Olds, P.C.

(57) ABSTRACT

A camera monitoring system (CMS) includes at least a first camera that provides a first vehicle side view and a second camera that provides a second vehicle side view, a controller that is communicatively connected to each of the first and second cameras such that the controller receives a first video feed from the first camera and a second video feed from the second camera, first and second displays that are in communication with the controller and configured to respectively receive and display the first and second video feeds, and a sensor package that is in communication with the controller. The sensor package is configured to be mounted on the tractor in a stowed position and to be dismounted from the tractor to a deployed position on the trailer. The sensor package is configured to provide a trailer view feed in the deployed position.

20 Claims, 8 Drawing Sheets

(56) References Cited

U.S. PATENT DOCUMENTS

| | | | |
|---|---|---|---|
| 2017/0244902 A1* | 8/2017 | DiMenichi | H04N 23/50 |
| 2018/0111648 A1* | 4/2018 | Amar | B62D 35/001 |
| 2019/0299859 A1* | 10/2019 | Lu | H04N 23/698 |
| 2020/0086807 A1* | 3/2020 | Shaeff | H04N 23/57 |
| 2020/0267820 A1* | 8/2020 | van den Brink | H05B 45/46 |
| 2020/0361384 A1* | 11/2020 | Larsson | B60R 1/26 |
| 2021/0039556 A1* | 2/2021 | Hartmann | B60R 1/003 |
| 2021/0178971 A1 | 6/2021 | Lu et al. | |
| 2021/0206329 A1 | 7/2021 | Hamlin et al. | |
| 2021/0235019 A1* | 7/2021 | Tonkin | H04N 23/634 |
| 2021/0245662 A1* | 8/2021 | Blank | B60R 1/081 |
| 2022/0032858 A1* | 2/2022 | LaCross | H04N 23/50 |
| 2022/0253964 A1* | 8/2022 | Corrodi | G06Q 10/08 |
| 2022/0314798 A1* | 10/2022 | Ribero | B60R 1/25 |
| 2022/0314884 A1* | 10/2022 | Uppara | B60R 1/26 |
| 2023/0018061 A1* | 1/2023 | Niewiadomski | B60D 1/36 |
| 2023/0082856 A1* | 3/2023 | Lutes | B60R 11/04 |
| | | | 348/148 |

* cited by examiner

MODULAR SEMI-TRAILER SENSOR SUITE

CROSS-REFERENCE TO RELATED APPLICATION

This application claims priority to U.S. Provisional Patent Application No. 63/354,925 filed on Jun. 23, 2022.

TECHNICAL FIELD

This disclosure relates to wheel tracking using a camera monitoring system (CMS) of a commercial truck, and more specifically to a system and method for maintaining view of a wheel position while the wheel is hidden.

SUMMARY

In one exemplary embodiment, a camera monitoring system (CMS) for a commercial vehicle having a tractor used to pull a trailer, the CMS includes at least a first camera that provides a first vehicle side view and a second camera that provides a second vehicle side view, a controller that is communicatively connected to each of the first and second cameras such that the controller receives a first video feed from the first camera and a second video feed from the second camera, first and second displays that are in communication with the controller and configured to respectively receive and display the first and second video feeds, and a sensor package that is in communication with the controller. The sensor package is configured to be mounted on the tractor in a stowed position and to be dismounted from the tractor to a deployed position on the trailer. The sensor package is configured to provide a trailer view feed in the deployed position.

In a further embodiment of any of the above, the tractor includes an exterior wall, and the stowed position is provided at the exterior wall.

In a further embodiment of any of the above, the CMS includes a lock that secures the sensor package to the exterior wall.

In a further embodiment of any of the above, a wiring harness tethers the sensor package to the exterior wall and provides communication between the sensor package and the controller.

In a further embodiment of any of the above, the first and second cameras each provide Class II and Class IV views, and the sensor package is configured to maintain trailer views alongside opposing sides of the trailer throughout various steering angles.

In a further embodiment of any of the above, the sensor package includes at least one of a camera, an ultrasonic sensor, a radar sensor and/or a lidar sensor to provide the trailer views.

In a further embodiment of any of the above, the controller is configured to determine a trailer angle based upon a comparison of data from at least one of the first and second cameras and the sensor package.

In a further embodiment of any of the above, the controller is configured to provide a fifth wheel view from the stowed position to assist in connecting the trailer to the tractor.

In a further embodiment of any of the above, the sensor package is provided in a unitary housing that spans opposing lateral sides of the trailer when in the deployed position.

In a further embodiment of any of the above, the unitary housing is spring loaded to provide a clamping force on the trailer.

In a further embodiment of any of the above, the sensor package is mounted to an undercarriage of the trailer.

In a further embodiment of any of the above, the sensor package is mounted to opposing forward-facing corners of the trailer.

In a further embodiment of any of the above, the sensor package is provided by first and second housings that are each configured to be positioned remotely from one another onto the trailer.

In another exemplary embodiment, a method of providing the trailer view alongside the trailer with the CMS, the method includes detaching the sensor package from the stowed position, mounting the sensor package onto preexisting mounting features on the trailer in the deployed position, and displaying the trailer view to a driver in the tractor.

In a further embodiment of any of the above, the detaching step includes unlocking the sensor package from the tractor.

In a further embodiment of any of the above, the mounting step includes extending a wiring harness that connects the sensor package to the tractor.

In a further embodiment of any of the above, the mounting step includes clamping the sensor package to the trailer.

In a further embodiment of any of the above, the method includes the step of calibrating the sensor package subsequent to the mounting step.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the CMS covers a larger field of view than a conventional mirror, or include views that are not fully obtainable via a conventional mirror.

In a typical CMS, there is a camera arm arranged on each of the left- and right-hand sides of the vehicle tractor to provide Class II and Class IV views. A display is provided on the A-pillar on both driver and passenger sides to display the field of view for the camera arm on that side, simulating a conventional mirror.

During vehicle turning maneuvers it is desirable to maintain the camera view of both sides of the trailer as the vehicle articulates relative to the tractor. One approach is to have the cameras pan the displayed image so as to keep the side of the trailer in the driver's view. Another approach is to provide cameras on the trailer. Current systems either have no trailer connectivity or require custom harnesses and connectors inlaid and installed on to each individual trailer. Such an approach is costly as a typical commercial tractor must connect with numerous trailers. Outfitting trailer fleets with cameras on each trailer is presently cost-prohibitive.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
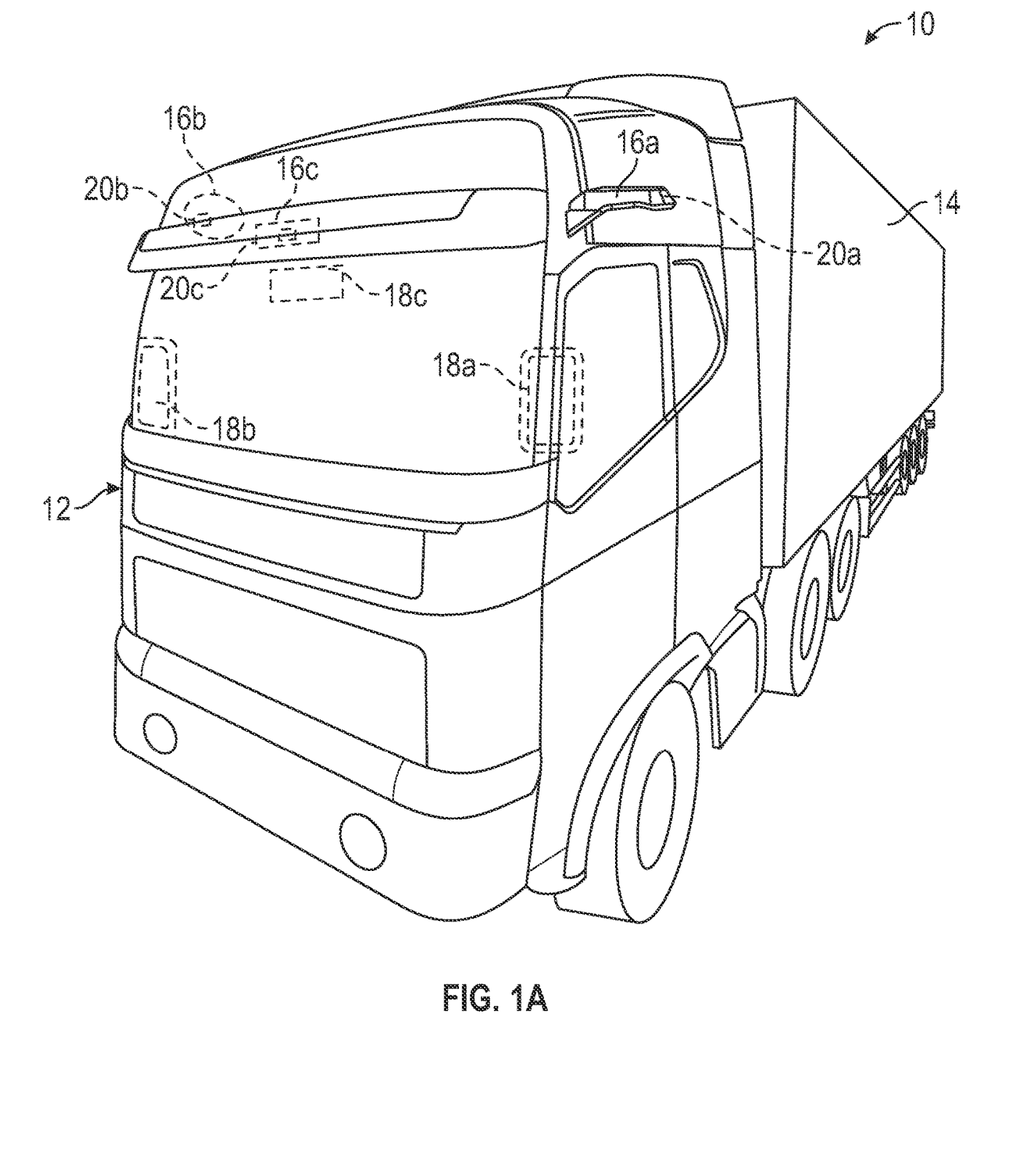
FIG. 1A is a schematic front view of a commercial truck with a camera monitoring system (CMS) used to provide at least Class II and Class IV views.
Figure 1B:
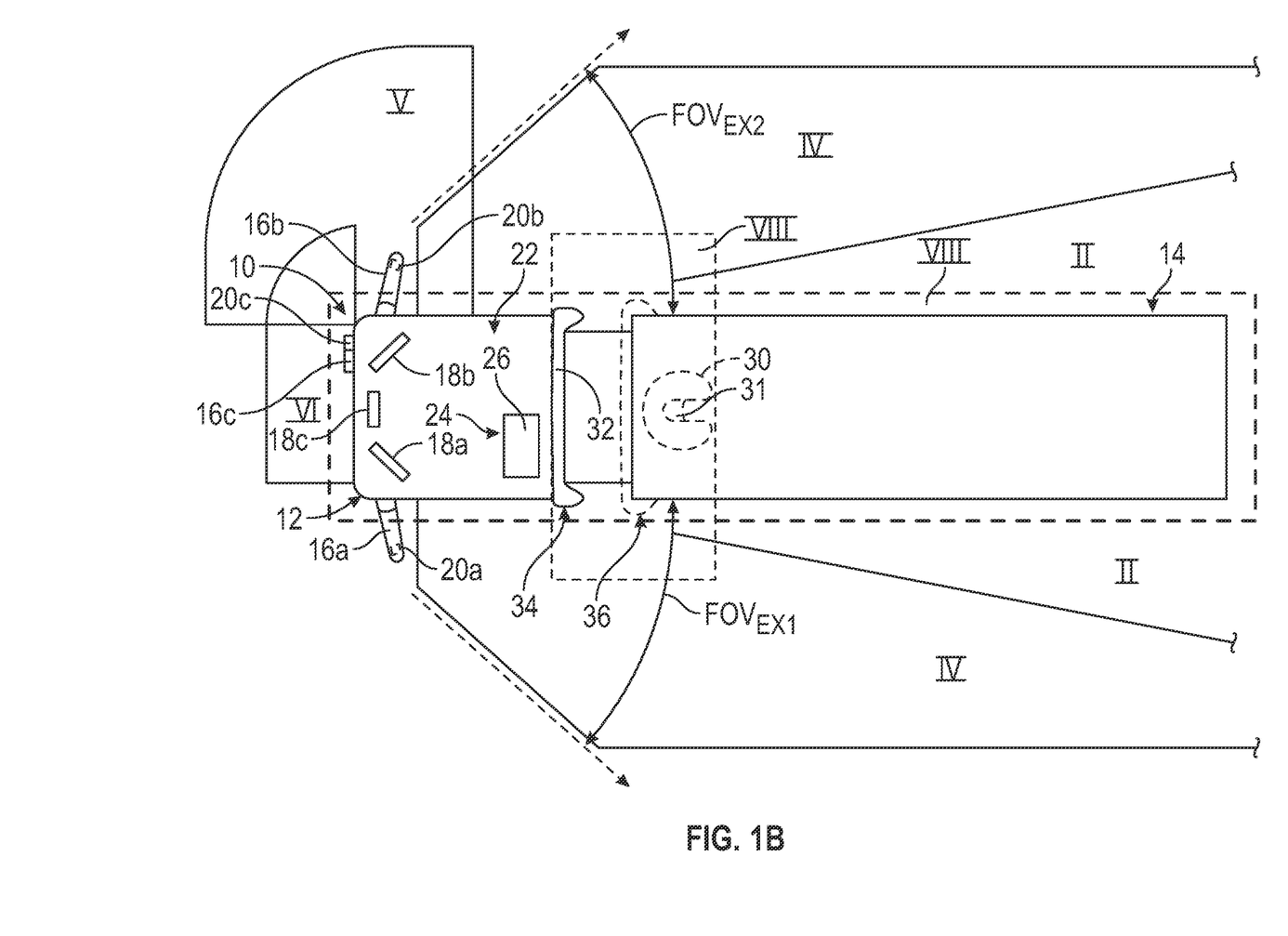
FIG. 1B is a schematic top view of a commercial truck with a camera mirror system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitoring system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view. The displays 18a, 18b, 18c face a driver region 24 within the cabin 22 where an operator is seated on a driver seat 26.

Figure 3:
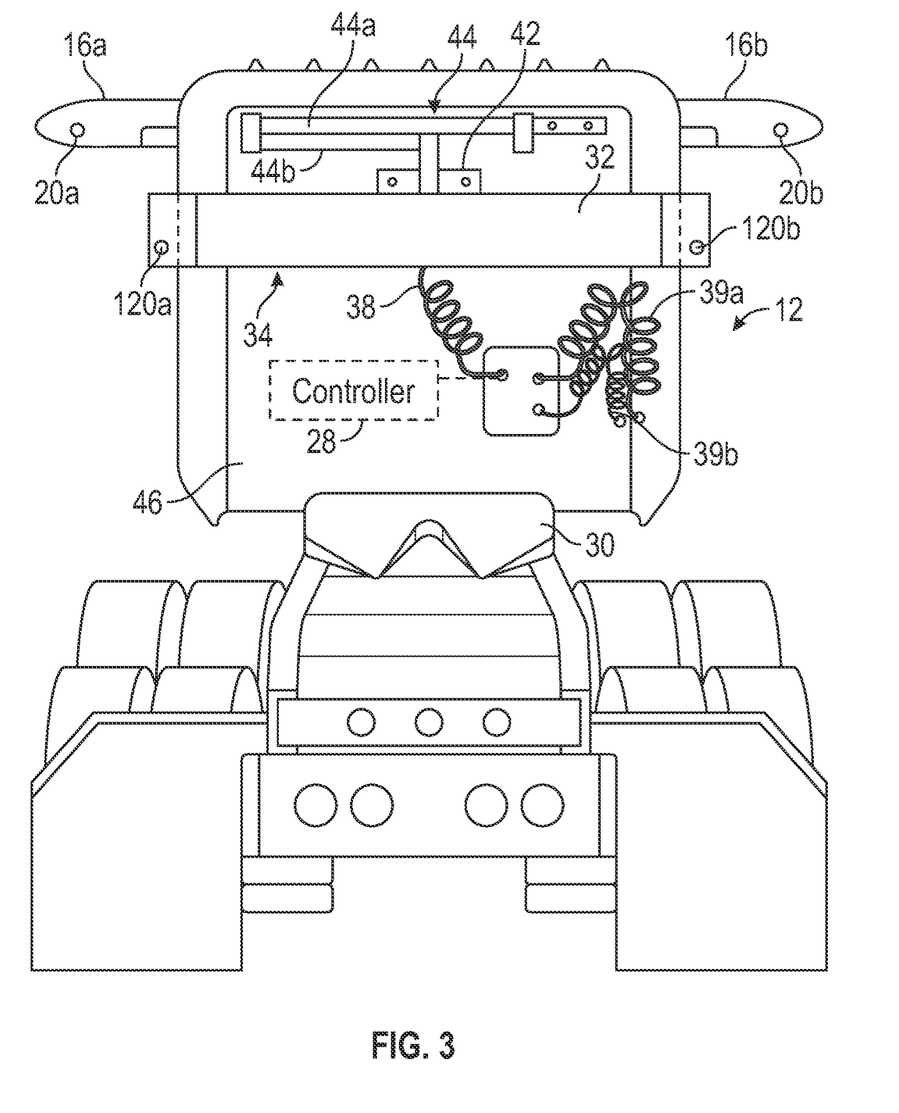
FIG. 3 is a perspective rear view of a commercial tractor with the disclosed sensor package for use with a commercial trailer.

The trailer 14 is secured to the tractor 12 at a fifth wheel 30, which provides a pivot 31 about which the trailer 14 articulates during turning maneuvers. A sensor package 32 is used to improve visibility along either side of the trailer 14 when in a deployed position 36 in which the sensor package 32 is mounted to the trailer 14. When not in use, the sensor package 32 may be mounted to the tractor 12 in a stowed position 32, for example, on the exterior of the vehicle (FIG. 3). A wiring harness 38 connects the sensor package 32 to a controller 28 of the CMS 15. In this manner, the sensor package 32 can be fully integrated into the CMS and be used with any trailer 14 that is pulled by the tractor 12 without the need of specialized wiring on the trailer 14.

Figure 2:
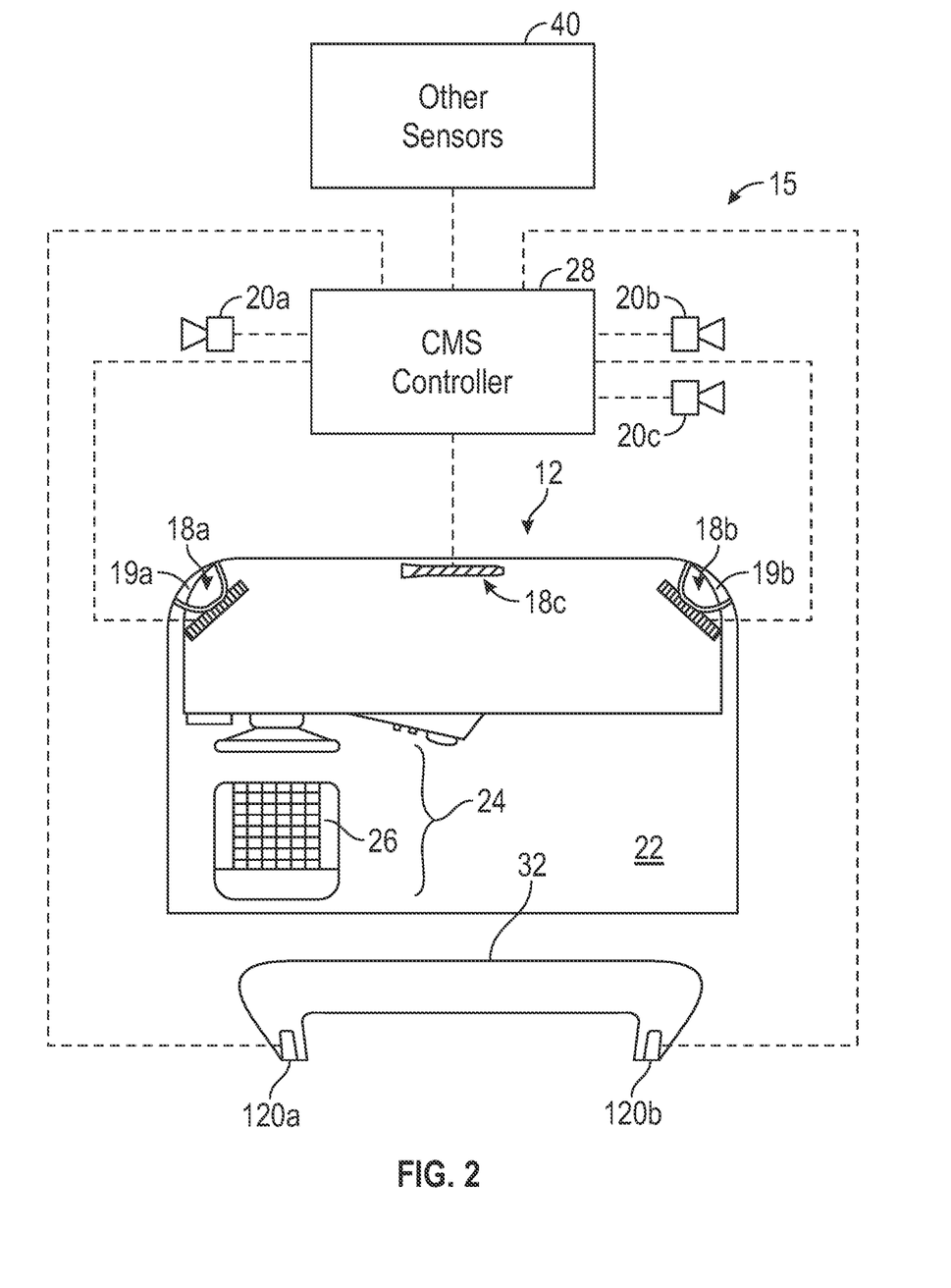
FIG. 2 is a schematic top view of a vehicle cabin including displays.

Referring to FIG. 2, the sensor package 32 may include at least first and second cameras 120a, 120b that respectively provide left- and right-side trailer views when in the deployed positions. Other sensors 40, such as radar, LiDAR and/or ultrasonic sensors may also be incorporated into the sensor package 32 to provide additional functionality to the CMS 15.

Video feeds from the first and second cameras 120a, 120b are provided respectively to the displays 18a, 18b and may be used to provide all or portions of the Class II and/or Class IV views. The images from the trailer's first and second cameras 120a, 120b can be stitched with or otherwise integrated with the images from the tractor's first and second cameras 20a, 20b. In one example, the controller 28 is configured to determine a trailer angle based upon a comparison of data from at least one of the trailer's first and second cameras 20a, 20b and the sensor package 32. When sensor package 32 is deployed and the first and second cameras 120a, 120b are in use, a panning feature may not be needed or desired, as can be appreciated from FIG. 4.

The sensor package 32 may be operable even from the stowed position to provided supplemental camera views or other information to that of the remaining CMS 15. For example, the controller 28 can be configured to provide a fifth wheel view from the stowed position to assist in connecting the trailer 14 to the tractor 12.

Turning to FIG. 3, the tractor 12 includes a rear exterior wall 46 to which the sensor package 32 is mounted in the stowed position 34, for example, on a bracket 42. The sensor package 32 can be locked to the bracket 42 for security. A boom 44 mounted to the tractor 12 and connected to the sensor package 32 by articulating arms 44a, 44b can be used to manually or robotically move the sensor package 32 between the stowed and deployed positions to reduce the burden on the vehicle operator.

Typically, various harnesses, such as trailer light wiring 39*a* and pneumatic brake lines 39*b*, are provided on the tractor 12 for connection to the trailer 14 once secured to the fifth wheel 32. The sensor package 32 may be tethered to the tractor 12 by a wiring harness 38, which is in communication with the controller 28. In this manner, the vehicle operator is not required to make any electrical connections in order to use the sensor package 32 when deployed.

Figure 4:
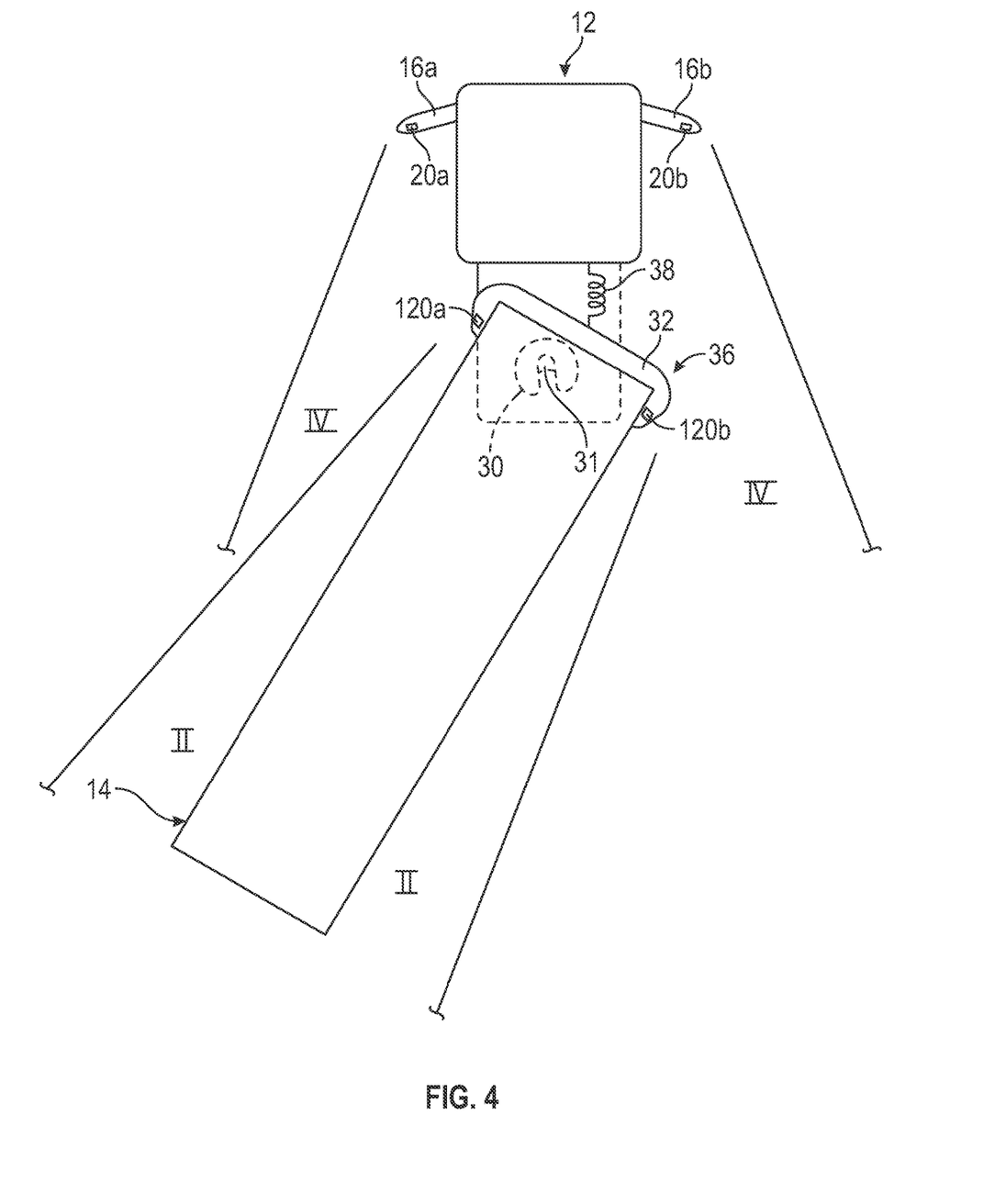
FIG. 4 is a schematic top view of the commercial truck with the sensor package mounted to the trailer in a deployed position and tethered to the tractor.

It is desirable to secure the sensor package 32 to the trailer 14 without the need for any trailer modifications, which may be impractical given the large number of trailers in a fleet. In one example, the sensor package 32 is provided in a unitary housing that spans opposing lateral sides of the trailer 14 when in the deployed position (FIG. 4). The sensor package 32 can be secured to the trailer 14 using clamps, fasteners or other securing elements.

Figure 5A:
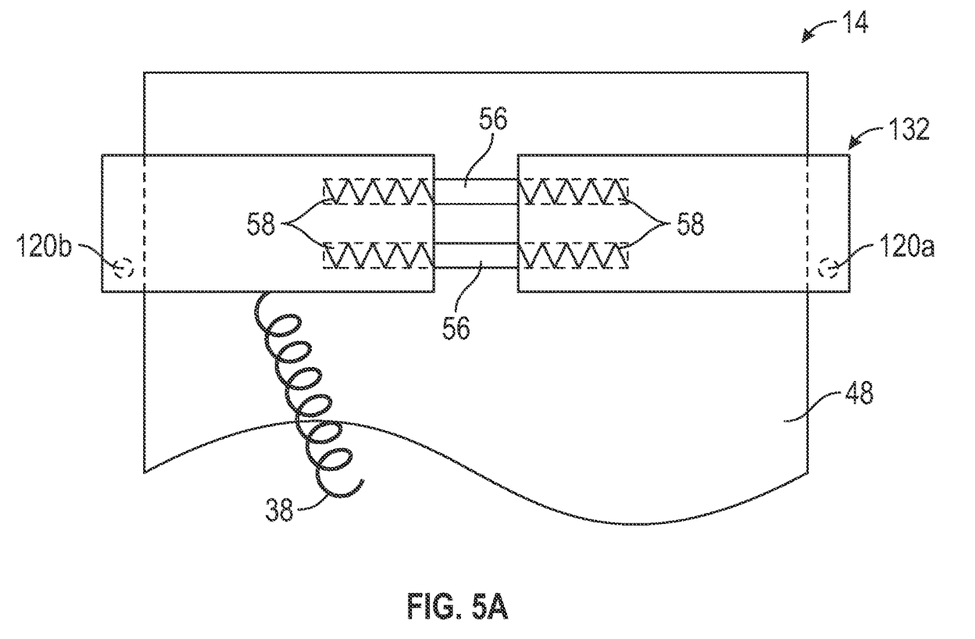
FIG. 5A is a schematic front view of a trailer with an example sensor package in the deployed position.
Figure 5B:
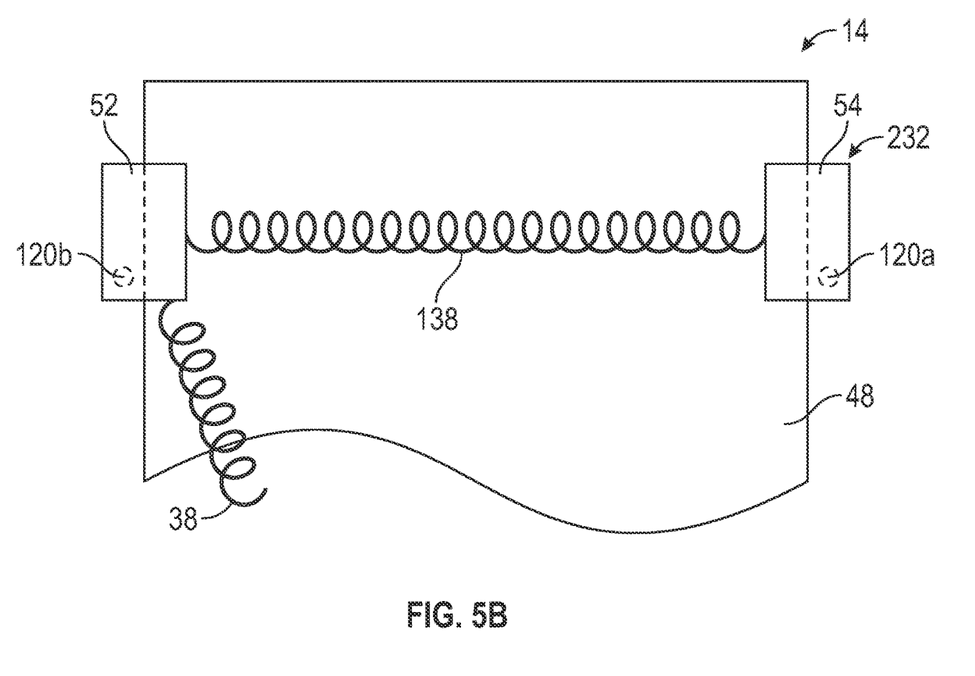
FIG. 5B is a schematic front view of the trailer with another example sensor package in the deployed position.
Figure 6A:
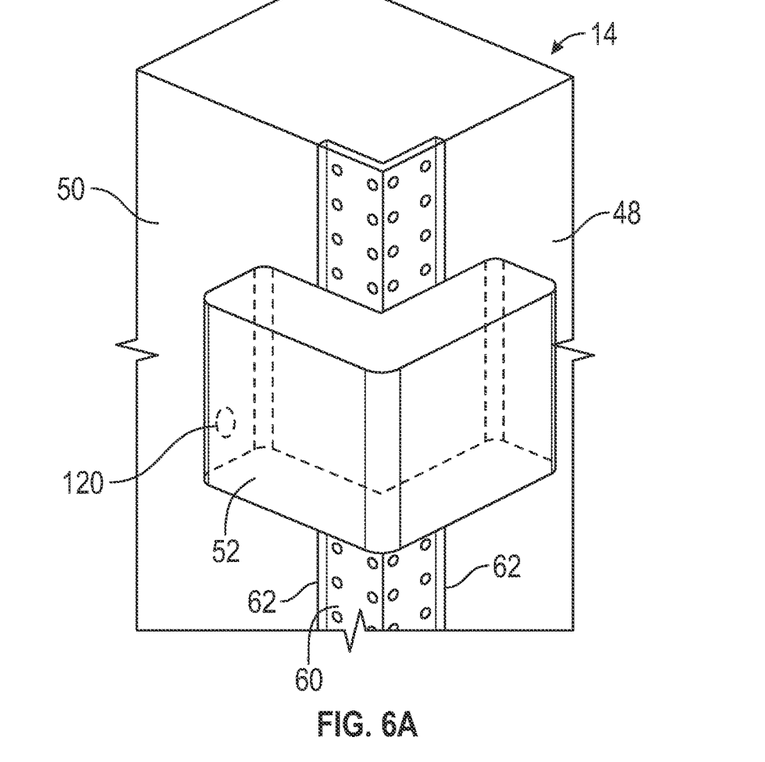
FIG. 6A is a top perspective view of a portion of the sensor package shown in FIG. 5B.
Figure 6B:
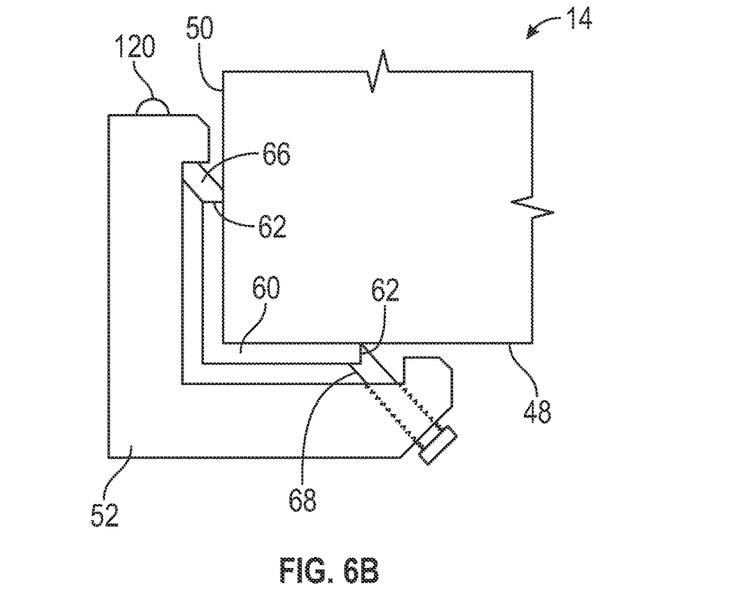
FIG. 6B is a top view of the sensor package portion shown in FIG. 6A clamped to the trailer.

As shown in FIG. 5A, the sensor package 132 may include first and second housings 52, 54 that are spring loaded with respect to one another using slides 56 and springs 58 to provide a clamping force on the trailer 14 when in the deployed position. In another example shown in FIG. 5B, the first and second housings 52, 54 of the sensor package 232 are discrete from one another in that they are separately secured to the trailer 14 remotely from one another and connected to one another by a wiring harness 138. The housings 52, 54 can be secured to the corner trailer frame 60 by clamping to the edges 62 of the frame using a hook 66 and fastener 68, as shown in FIGS. 6A and 6B.

Figure 7A:
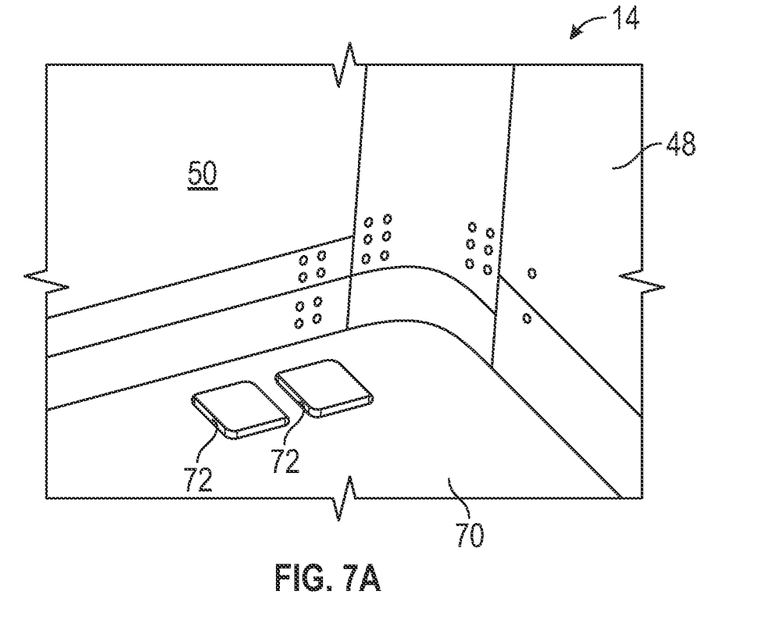
FIG. 7A is bottom perspective view of the trailer illustrating pre-existing apertures used to mount the sensor package to the trailer in the deployed position.
Figure 7B:
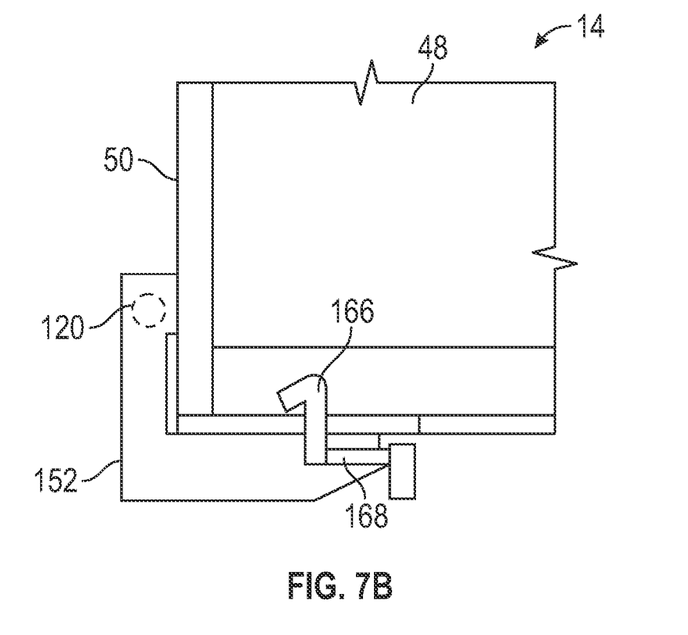
FIG. 7B is a front view of a sensor package clamped to one of the apertures shown in FIG. 7A.

In another example, a housing 152 of the sensor package 232 is mounted to structure 70 of an undercarriage of the trailer 14 using pre-existing apertures 72, as shown in FIGS. 7A and 7B. Again, a hook 166 and fastener 168 arrangement can be used.

In operation, the method of providing the trailer view alongside the trailer 14 includes detaching the sensor package 32 from the stowed position 34, for example, by unlocking the sensor package 32 and moving it with the boom 44 or by hand. The sensor package 32 can be mounted onto preexisting mounting features on the trailer 14, such as corners, brackets, or apertures, in the deployed position 36, by clamping or other securing features. The wiring harness 38 is thus extended. From the stowed and/or deployed positions 34, 36, the trailer and/or other views can be displayed to the driver in the tractor 12 via displays 18. The sensor package 32 may be calibrate subsequent mounting, which can be performed automatically by software in the controller 28.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera monitoring system (CMS) for a commercial vehicle having a tractor used to pull a trailer, the CMS comprising:
   at least a first camera providing a first vehicle side view and a second camera providing a second vehicle side view;
   a controller communicatively connected to each of the first and second cameras such that the controller receives a first video feed from the first camera and a second video feed from the second camera;
   first and second displays in communication with the controller and configured to respectively receive and display the first and second video feeds; and
   a sensor package in communication with the controller, the sensor package configured to be mounted on the tractor in a stowed position and to be dismounted from the tractor to a deployed position on the trailer, the sensor package including a third camera and a fourth camera configured to provide a trailer view feed in the deployed position, the sensor package mounted to opposing forward-facing corners of the trailer when in the deployed position, wherein the third camera is provided at one of the forward-facing corners and the fourth camera is provided at the other of the forward-facing corners.

2. The CMS of claim 1, wherein the tractor includes an exterior wall, and the stowed position is provided at the exterior wall.

3. The CMS of claim 2, the CMS comprising a lock securing the sensor package to the exterior wall.

4. The CMS of claim 2, wherein a wiring harness tethers the sensor package to the exterior wall and provides communication between the sensor package and the controller.

5. The CMS of claim 1, wherein the first and second cameras each provide rear-facing fields of view, and the sensor package is configured to maintain trailer views alongside opposing sides of the trailer throughout various steering angles.

6. The CMS of claim 5, wherein the sensor package includes at least one of a camera, an ultrasonic sensor, a radar sensor and/or a lidar sensor to provide the trailer views.

7. The CMS of claim 1, wherein the controller is configured to determine a trailer angle based upon a comparison of data from at least one of the first and second cameras and the sensor package.

8. The CMS of claim 1, wherein the controller is configured to provide a fifth wheel view from the stowed position to assist in connecting the trailer to the tractor.

9. The CMS of claim 1, wherein the sensor package is provided in a unitary housing that spans opposing lateral sides of the trailer when in the deployed position.

10. The CMS of claim 1, wherein the sensor package is provided by first and second housings each configured to be positioned remotely from one another onto the trailer, the third camera provided in the first housing, and the fourth camera provided in the second housing.

11. The CMS of claim 10, wherein the first and second housings are spring loaded to provide a clamping force on the trailer.

12. The CMS of claim 1, wherein the third and fourth cameras are rear-facing, the third camera provides a left side trailer view, and the fourth camera provides a right side trailer view.

13. The CMS of claim 12, wherein the controller is communicatively connected to each of the third and fourth cameras, such that the controller receives a third video feed from the third camera and a fourth video feed from the fourth camera, and the first and second displays are configured to respectively receive and display the third and fourth video feeds.

14. The CMS of claim 13, wherein the controller is configured to determine a trailer angle based upon a comparison of data from at least one of the first and second cameras and at least one of the third and fourth cameras.

15. The CMS of claim 1, wherein the controller is communicatively connected to each of the third and fourth cameras, such that the controller receives a third video feed from the third camera and a fourth video feed from the fourth camera, and the first and second displays are configured to respectively receive and display the third and fourth video feeds.

16. A method of providing the trailer view feed with the CMS according to claim 1, the method comprising:
   detaching the sensor package from the stowed position;
   mounting the sensor package onto preexisting mounting features on the trailer in the deployed position; and
   displaying the trailer view feed to a driver in the tractor.

17. The method of claim 16, wherein the detaching step includes unlocking the sensor package from the tractor.

18. The method of claim 16, wherein the mounting step includes extending a wiring harness connecting the sensor package to the tractor.

19. The method of claim 16, wherein the mounting step includes clamping the sensor package to the trailer.

20. The method of claim 16, comprising the step of calibrating the sensor package subsequent to the mounting step.

* * * * *